(12) United States Patent
Parran et al.

(10) Patent No.: US 8,353,308 B2
(45) Date of Patent: Jan. 15, 2013

(54) INFLATABLE FLUID CONDUIT PLUG

(75) Inventors: Shachar Parran, Thornhill (CA); Savio D'Souza, Mississauga (CA); Gad Reem, Toronto (CA)

(73) Assignee: ChemiGreen Inc., Toronto, Ontario (CA)

( * ) Notice: Subject to any disclaimer, the term of this patent is extended or adjusted under 35 U.S.C. 154(b) by 539 days.

(21) Appl. No.: 12/600,492

(22) PCT Filed: Jun. 30, 2008

(86) PCT No.: PCT/CA2008/001225
§ 371 (c)(1),
(2), (4) Date: Nov. 17, 2009

(87) PCT Pub. No.: WO2009/012563
PCT Pub. Date: Jan. 29, 2009

(65) Prior Publication Data
US 2010/0152906 A1      Jun. 17, 2010

Related U.S. Application Data (60) Provisional application No. 60/952,124, filed on Jul. 26, 2007.

(51) Int. Cl.
*F16L 5/00* (2006.01)
*F16L 55/12* (2006.01)

(52) U.S. Cl. .......... 137/362; 138/93; 251/61.1; 700/282

(58) Field of Classification Search .................. 137/362, 137/487.5, 1–12, 68.29; 251/61.1; 138/93, 138/94; 700/282
See application file for complete search history.

(56) References Cited

U.S. PATENT DOCUMENTS

| | | | | | |
|---|---|---|---|---|---|
| 4,458,721 | A | * | 7/1984 | Yie et al. | 138/93 |
| 4,787,408 | A | * | 11/1988 | Twerdochlib | 137/14 |
| 5,038,831 | A | | 8/1991 | Masson | |
| 5,348,270 | A | * | 9/1994 | Dinh | 251/61.1 |
| 5,413,136 | A | * | 5/1995 | Prescott | 137/68.3 |
| 5,558,131 | A | * | 9/1996 | Cohee et al. | 138/93 |
| 5,907,491 | A | * | 5/1999 | Canada et al. | 700/108 |
| 2002/0027504 | A1 | * | 3/2002 | Davis et al. | 340/540 |
| 2006/0007008 | A1 | * | 1/2006 | Kates | 340/605 |

FOREIGN PATENT DOCUMENTS

| | | |
|---|---|---|
| CA | 2073844 | 1/1994 |
| WO | 2006049509 | 5/2006 |

OTHER PUBLICATIONS

English translation of CA2073844 to Levesque et al., published 1994.

* cited by examiner

*Primary Examiner* — Craig Schneider
*Assistant Examiner* — David Colon Morales
(74) *Attorney, Agent, or Firm* — Integral Intellectual Property Inc.; Miriam Paton (57) ABSTRACT

An inflatable conduit plug is used to seal a conduit such as a floor drain or an air vent. The conduit plug includes a shroud that is removably sealed within the conduit so that fluids pass through the shroud opening. Axially disposed within the shroud is an inflatable bladder adapted for closing the shroud opening. The inflatable bladder is inflated by an inflation signal generated by a controller upon receipt of a contamination signal received from a remote contamination detector. The plug operates in a wireless environment and can be controlled remotely. The plug can also be adapted for diverting contamination away from sensitive lands and storm drains.

6 Claims, 8 Drawing Sheets

INFLATABLE FLUID CONDUIT PLUG

This application is a U.S. National Phase Application under 35 U.S.C. 371 of PCT International Application No. PCT/CA2008/001225, which has an international filing date of Jun. 30, 2008, and which claims priority from U.S. Provisional Patent Application No. 60/952,124, filed Jul. 26, 2007, both of which are incorporated herein by reference in their entirety.

TECHNICAL FIELD

This invention relates to devices for closing conduits against fluid flow and in particular relates to an inflatable fluid conduit plug adapted to stop the flow of contaminants into a fluid conduit.

BACKGROUND

Industrial processes often leak fluids in liquid and gaseous state that are contaminants and pose a threat to the natural environment. These discharges may be the on-going byproduct of a process or they may be the result of an accident such as operator error, a fire or an explosion. Either way, it is imperative that these contaminants not be allowed to enter natural water flows or the atmosphere. Industrial facilities have a large number of access conduits to the natural environment such as floor drains and exhaust stacks and vents. These conduits are permitted to discharge fluids into the natural environment either in a non-contaminated state or at permissible contamination thresholds established by law. Beyond these thresholds, the contaminated discharges are not environmentally benign and are unlawful under environmental laws and regulations. Therefore, there is a need to maintain control over discharge of contaminated fluids into the natural environment by ensuring that fluid conduits can be closed before contaminated fluids can pass through them.

Industry relies upon a variety of apparatus and methods to control or prevent contaminated fluid discharges. Absorbents may be used to absorb contaminants spilled onto a surface. However, this is often "after-the-fact" and will not stop contaminants from entering a drain. Ventilation dampers may close upon a leak of contaminated fluid but the dampers may not seal the conduit entirely and may be too slow to adequately respond to a large release of contaminants. Closure valves can be inserted into fluid conduits downstream of drains to prevent the discharge of contaminated fluids. However, these valves may failure to close due to mechanical problems or close too slowly to prevent leakage. In many industrial facilities the valves can only be actuated by a human operator and this type of procedure has its own innate unreliabilities and deficiencies.

Therefore, there is an on-going requirement to automatically, swiftly and reliably close fluid conduits that have access to the natural environment before any contaminant can reach the natural environment.

SUMMARY

In accordance with an embodiment of the present invention there is provided an apparatus, namely, an inflatable fluid conduit plug adapted to close fluid conduits that may expel contaminants to the natural environment. Examples of such fluid conduits include floor drains and exhaust stacks and vents. The conduit plug comprises a shroud for sealed insertion into the conduit. Within the shroud is disposed an inflatable bladder adapted for closing the shroud opening upon a bladder inflation signal. The bladder is inflated by a suitable fluid which is generally a gas such as carbon dioxide or nitrogen. The gas is contained in a pressurized reservoir such as a gas cartridge or cylinder which is housed within the apparatus. The apparatus is designed to be self-contained, that is, with on-board gas and power sources so that it is able to function without the need for external connections to gas or electrical conduits. The conduit plug includes contaminant detection means for generating a contaminant signal and a controller for receiving the contaminant signal and transmitting an inflation signal. The inflation signal will open the pathway between the gas reservoir and the bladder thereby inflating the bladder. The pathway between the gas reservoir and the bladder may be closed using a diaphragm which is subsequently punctured by a pin during an inflation signal. Alternatively, the pathway may be closed using a quick-open valve. The shroud is shaped to have the same contour as the conduit so that the shroud can be inserted axially into the conduit and sealed against the walls of the conduit. In this manner, fluids will flow through the shroud opening and can be blocked by bladder inflation.

The bladder is fabricated from a suitable chemically resistant material. It is disposed axially within the shroud and supported by bracing rods extending from the inside surface of the shroud. The bladder is adapted to inflate rapidly to prevent contaminant leakage through the shroud opening. The bladder may be equipped with an accelerometer for monitoring inflation speed and an alarm for alerting an operator when the inflation speed is sub-optimum.

In another embodiment of the invention there is provided a plurality of inflatable dams that are adapted for ground spill diversion and storm/sewer drain diversion. The dams are fabricated as inflatable bladders with automatic inflation means comprising a pressurized gas reservoir electrical power source and inflation signal receiver. Such dams can be employed around sensitive environmental zones around an industrial site or around storm/sewer drains within an industrial site such as on a roadway or parking lot. Should a spill occur on a surface such as a roadway, the dams can be activated by chemical sensors before the spill reaches a drain. The dams can also be actuated remotely upon a wireless signal.

Returning to the plug embodiment of the invention, contaminant sensors may be disposed within the shroud opening or remote from the plug. The contaminant sensors are adapted to permit an uncontaminated fluid flow into the shroud but they will generate an inflation signal when fluid flow contains a contaminant. An inflation signal can also be generated by an operator from a remote location by wireless means.

The plug further comprises an electrical circuit comprising a battery for powering a micro-processor. The micro-processor comprises a voltmeter for monitoring battery output, a low voltage alarm for alerting an operator, a pressure gauge for monitoring pressure within the bladder, a low pressure alarm for alerting the operator, an electrically actuated inflation valve between the bladder and the reservoir and an alarm for alerting the operator of valve actuation. The micro-processor is further adapted to receive a contaminant detection signal from a contaminant sensor and transmit an inflation signal to the electrically actuated inflation valve. The sensors may be programmable for detection of a plurality of contaminants. The micro-processor may be programmable for a plurality of contaminant threshold values. The micro-processor can send and receive data and commands over an encrypted wireless network.

DETAILED DESCRIPTION

Inflatable Conduit Bladder

Figure 1:
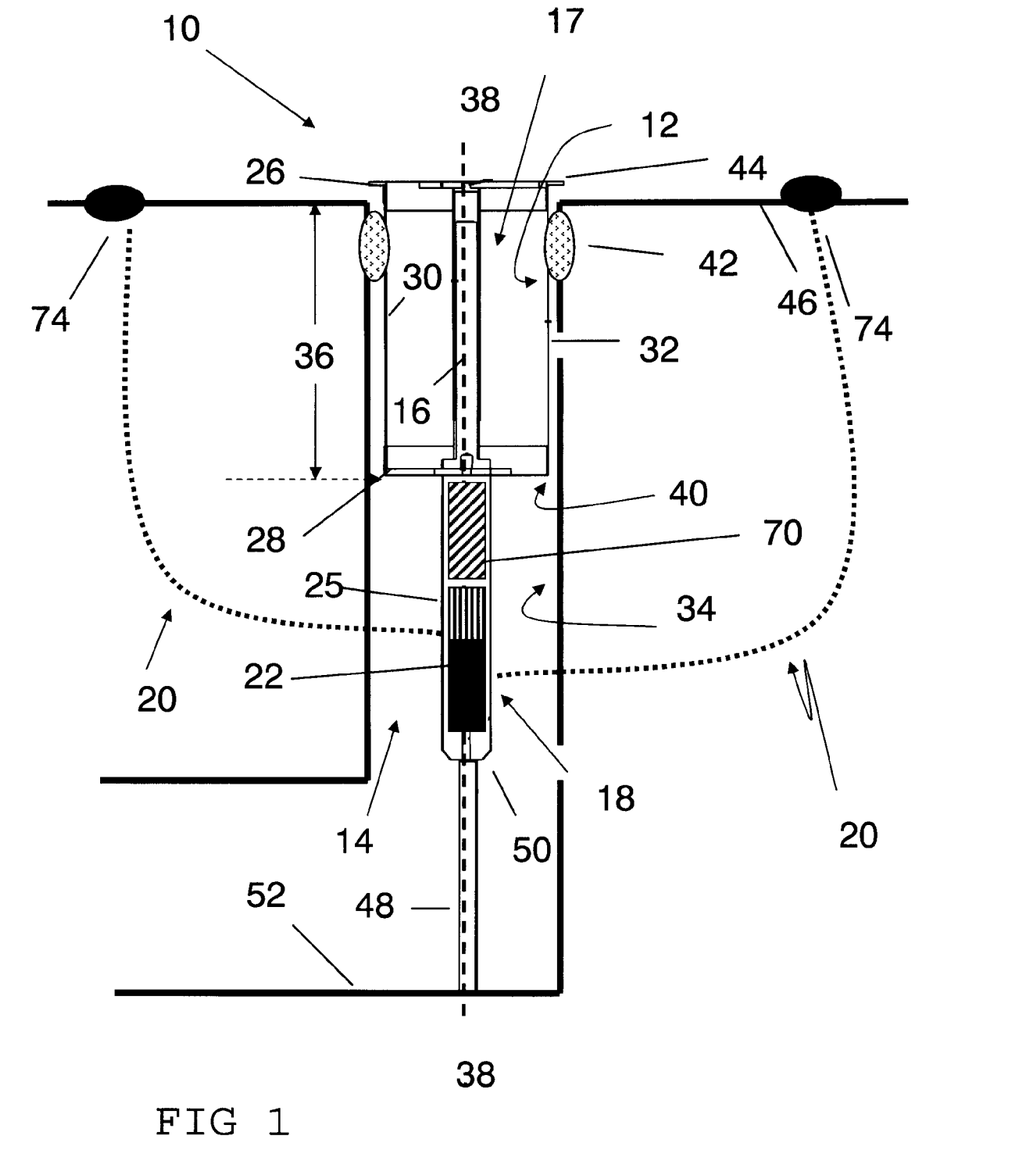
FIG. 1 shows a cross-section of one example of an embodiment of the invention as it might appear inserted into a floor drain.
Figure 2:
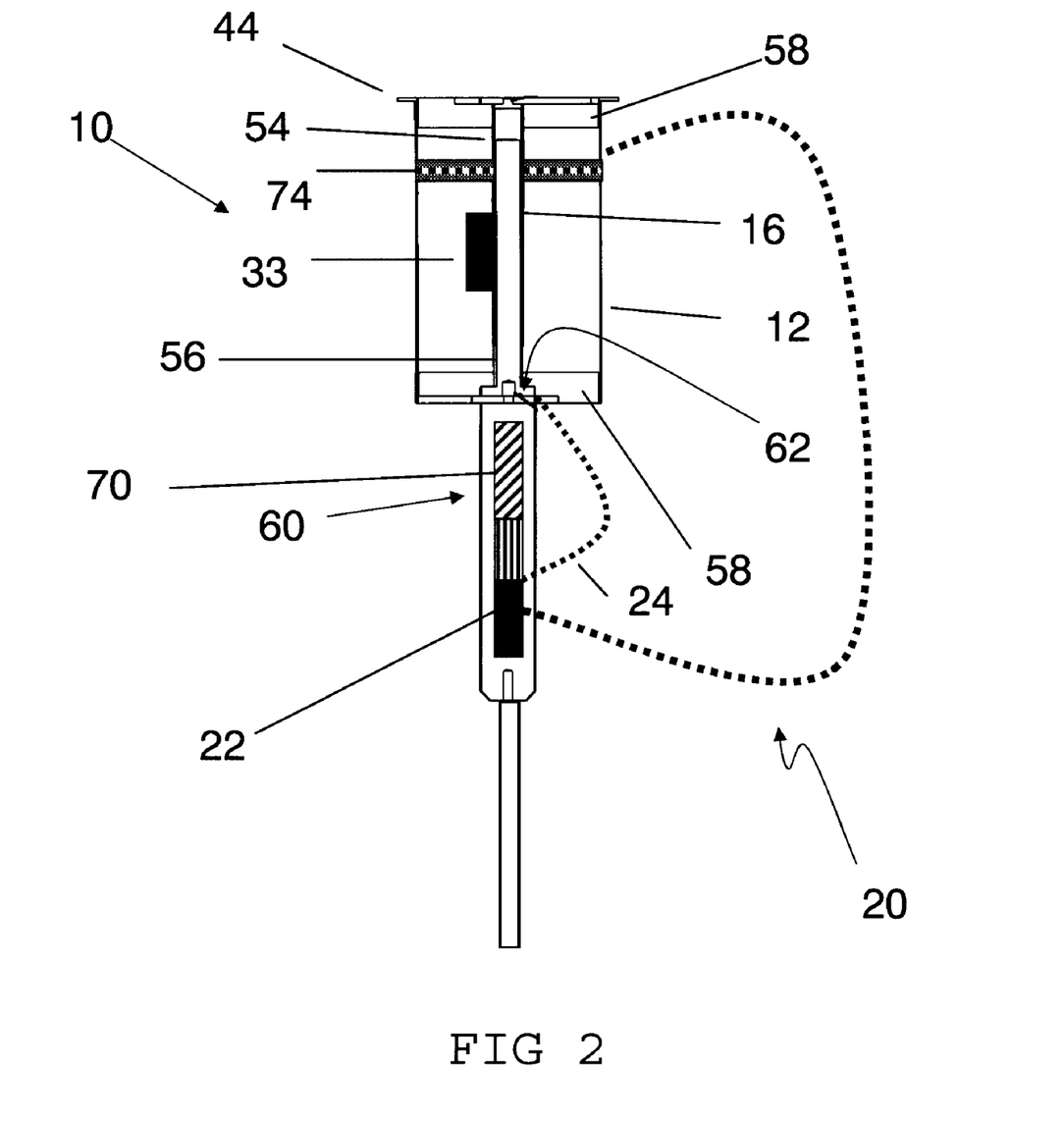
FIG. 2 shows a cross-section of the same example of the embodiment of the invention as shown in FIG. 1 removed from the floor drain.
Figure 3:
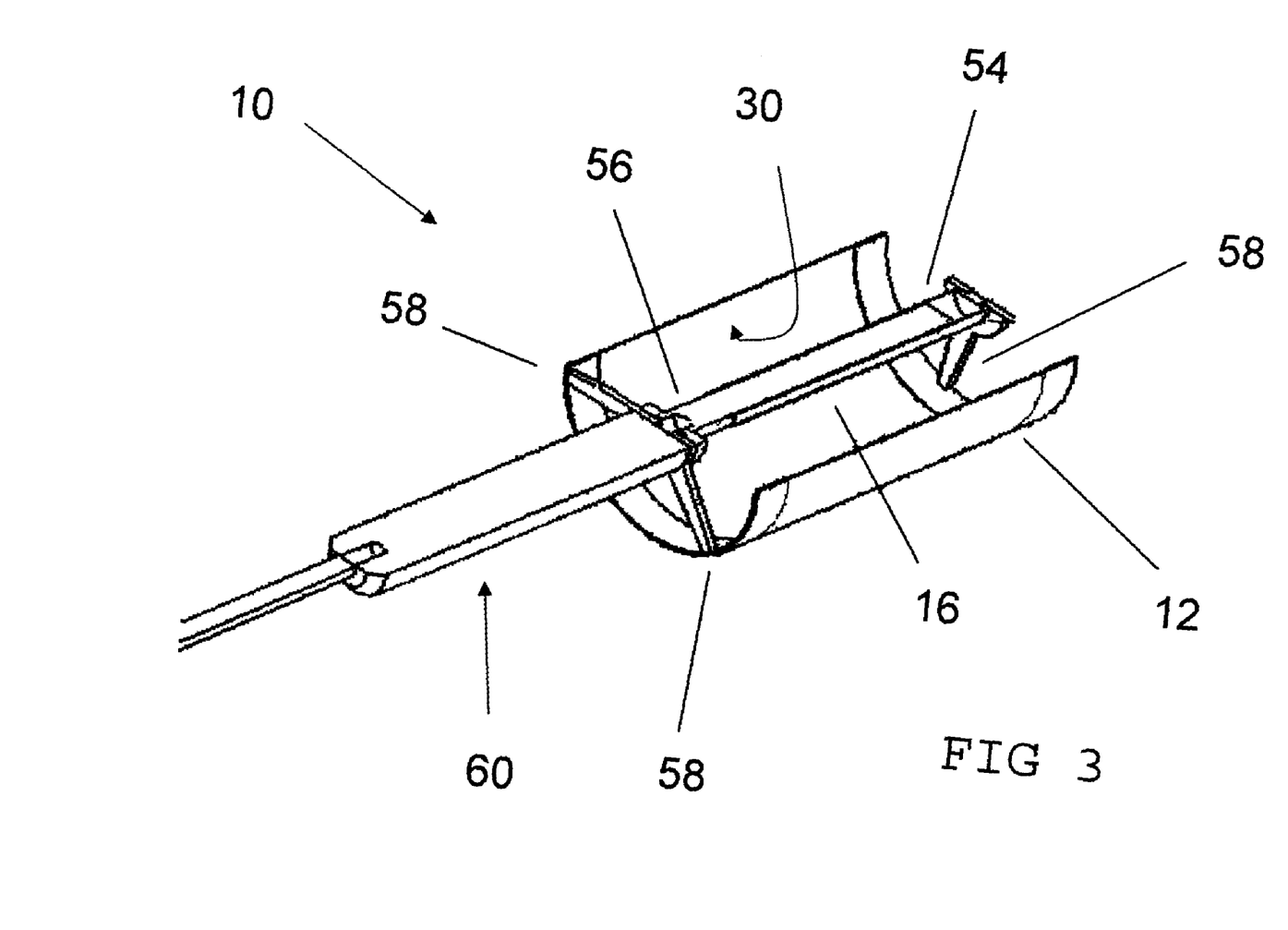
FIG. 3 shows the flange arrangement of yet another example of an embodiment of the invention in perspective cross-sectional view.

Referring to FIGS. 1, 2 and 3 there is shown a cross-section of one example of the invention 10 which is an inflatable fluid conduit plug comprising a shroud 12 for sealed insertion into the conduit 14. One advantage of this example is that since many drain conduits have worn and damaged surfaces, the shroud ensures that the bladder 16 is able to inflate in a fluid-sealed configuration against the smooth shroud surface and not the irregular surface of a damaged conduit. This ensures that the conduit is not further damaged by the inflating bladder and that the bladder is not punctured by an irregular surface. Therefore, existing infrastructure can be used with the invention without having to replace worn conduits. The inflatable bladder 16 is disposed within the shroud 12 for closing the shroud opening 17 upon receipt of an inflation signal from the controller 22. The bladder inflation means shown generally as 18 comprises a cylinder or reservoir of compressed gas 70, a valve 62, a DC power supply 25, typically a battery, and controller 22. The reservoir of compressed gas 70 is in fluid communication with the bladder 16. Contaminant detectors 74 can be located throughout the industrial site and generally anywhere that contaminants need to be detected. The detectors are in wireless communication with the controller as shown by the dotted lines and generate a contaminant signal 20 that is received by an RF receiver located within the controller 22. The controller will process the contaminant signal 20 into an inflation signal 24 (FIG. 2) which is received by valve 62. Valve 62 will then open and pressurized gas will inflate the bladder thereby closing the shroud opening 17.

The shroud 12 has a top 26 and a bottom 28, an inner surface 30 and an outer surface 32. The outer surface is congruent with and adapted to complement the shape of the inner conduit wall 34. For example, a floor drain is generally circular and a storm drain is generally square. The shroud can be adapted to fit both types of conduit. By using a shroud inside the conduit there is no need to replace the conduit prior to installing my invention. The shroud will bear the force of bladder inflation and not further damage older conduits. The shroud 12 is further adapted to extend a predetermined distance 36 into the conduit 14 to ensure adequate sealing when inflated. Shroud 12 is disposed axially 38 within the conduit 14 and inflation pressure generated by the bladder when in contact with the shroud inside wall 30 should be equal around the circumference of the shroud wall 30. The shroud 12 outer surface 32 is in such positional agreement with the inner wall 34 of the conduit 14 that there is a narrow annulus 40 formed between them. The annulus 40 is sealed fluid tight with sealing means 42 at the shroud top 26 thereby achieving a shroud sealed insertion and fixing the plug within the conduit in a removable manner. Sealing means 42 can be any suitable sealing compound as long as it is chemically resistant.

In the example shown in FIGS. 1 and 2, there is illustrated a flange 44 extending flush from the top 26 of the shroud 12. The flange 44 is adapted to suspend the plug 10 from a surface 46 such as a floor where the plug is inserted into a floor drain. In FIG. 1 the flange 44 is shown slightly elevated above the floor for illustrative purposes but would sit on the surface 46 when installed. The flange can also be used as an adhesive or fastening surface to adhere the plug in an upside-down configuration to a suspended surface such as when the plug is mounted into a ventilation duct within a roof or ceiling surface.

In the same example as shown in FIGS. 1 and 2, the plug may be supported from inside 14 a conduit by a member 48 depending from the bottom 50 of the inflation means housing 60 to a supporting surface 52 within the conduit. The member may also be adjustable to suit a variety of conduit depths.

The bladder 16 is fabricated from a suitable chemically resistant material such as Tyvec®, Tychem® or polyurethane.

Referring to FIG. 2, there is shown plug 10 in cross-section outside of the drain. The bladder 16 is disposed axially within the shroud 12. The bladder has a top 54 and a bottom 56 end and is fixed in place to the inner surface of the shroud by bracing rods 58 extending from the top and bottom of the shroud top inner surface 30.

FIG. 3 illustrates the same example 10 as in FIG. 2 in a perspective cross-sectional view to better illustrate the bracing rods 58 between the bladder top 54 and bottom 56 and the inner surface 30 of the shroud 12.

The bladder 16 is threadably connected to the inflation means housing 60 by valve 62 to which gas reservoir 70 is also threadably attached. Valve 62 may be a firing pin which ruptures a diaphragm on the top of the gas reservoir in order to inflate the bladder. In another example of the invention, and as noted below, the bladder 16 further comprises an accelerometer 33 (FIG. 2 and FIG. 7) for detecting inflation speed and an alarm 31 for alerting an operator 68 when the inflation speed is sub-optimum. The suitable inflation fluid is usually a gas but other inflation media can be used such as foam or a liquid.

Contaminant detectors 74 are sensors adapted to permit a desired fluid flow such as clean water or clean air into the shroud opening 17. When contaminants are detected by the sensor 74 a contaminant signal 20 is generated (dotted line). This will trigger an inflation signal 24 and actuate the bladder 16 within the shroud opening 17. In one example of the invention illustrated in FIG. 2, the contaminant sensor 74 is disposed at the top of the shroud opening 17 so a contaminant signal 20 will be generated as soon as the contaminant contacts the top of the shroud opening. This is illustrated as a detection band 74 (FIG. 2) around the inside surface of the shroud. Such detectors are well known in the art. The contaminant signal is received wirelessly by the controller 22 which in turn generates the inflation signal 24. In another example of the invention the contaminant sensor 74 is disposed remote from the conduit 14 so that a contaminant signal 20 and a subsequent inflation signal 24 are generated prior to the contaminant entering the conduit. In yet another example of the invention, the inflation signal 24 may be generated independent of a contaminant signal and manually by an operator 68 from a remote location. In all examples, the contaminant sensors are comprised of contaminant sensing means, a RF signal emitter and power source so that they may operate independently and remotely from the plug. The RF signal emitted by the contaminant sensors are received by the controller's RF receiver and processed.

Figure 4:
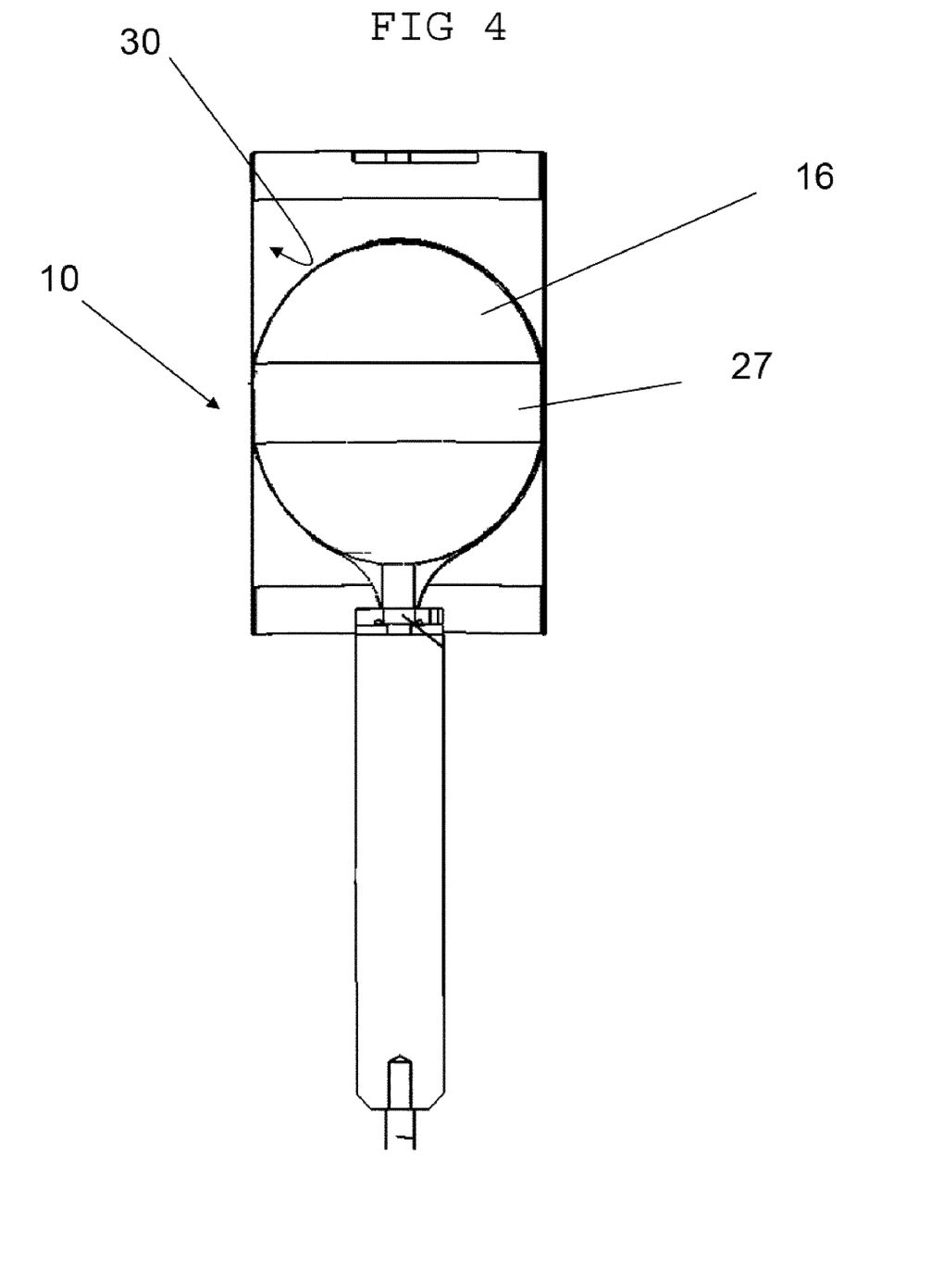
FIG. 4 shows one example of an embodiment of the invention in an inflated state.

Referring now to FIG. 4, there is shown the plug 10 having bladder 16 in an inflated state. In this configuration the bladder 16 is shown having a circular shape. It could have other shapes as well to suit the shape of the conduit in which the device is inserted. There is also illustrated contact area 27 between the bladder and the inner wall 30 of the shroud 12. Depending on the application this contact area 27 can be adjusted to ensure a fluid seal in the conduit.

Inflatable Diversion Bladder

Figure 5:
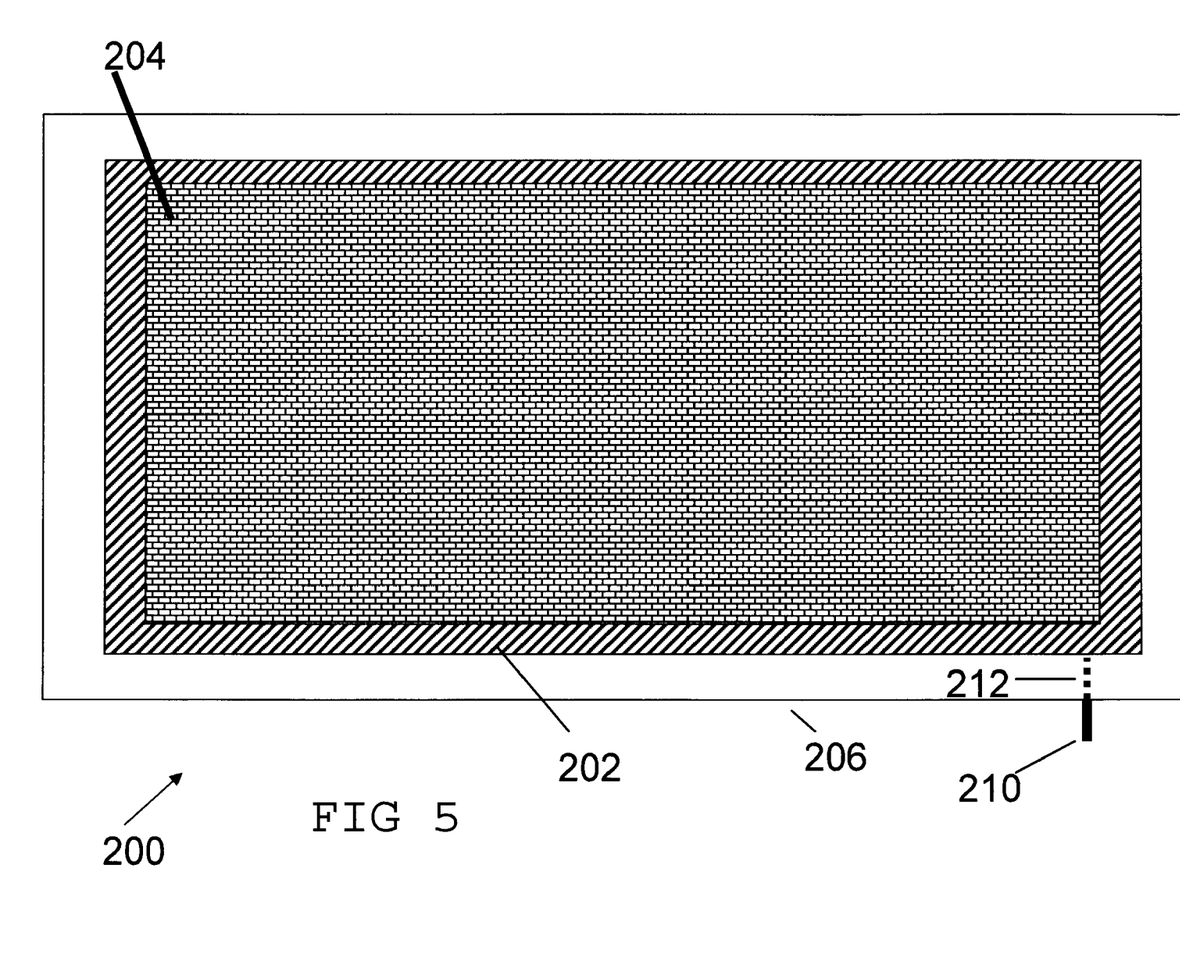
FIG. 5 shows another embodiment of the invention.

Referring now to FIG. 5 there is shown another example of the invention 200 where the inflatable bladder 202 is used to form a diversion obstacle, dam or berm to divert contaminants away from a sensitive ecological area 204 such as outside yards or lawns. The area may be surrounded by an array of contaminant detectors 206 that is in wireless communication 210 with the control 170 (FIG. 8) and in wireless communication 212 with the bladder 202 so that when a contaminant is detected an alarm is sounded at the control for the operator and an inflation signal 212 is sent to the bladder.

Figure 6:
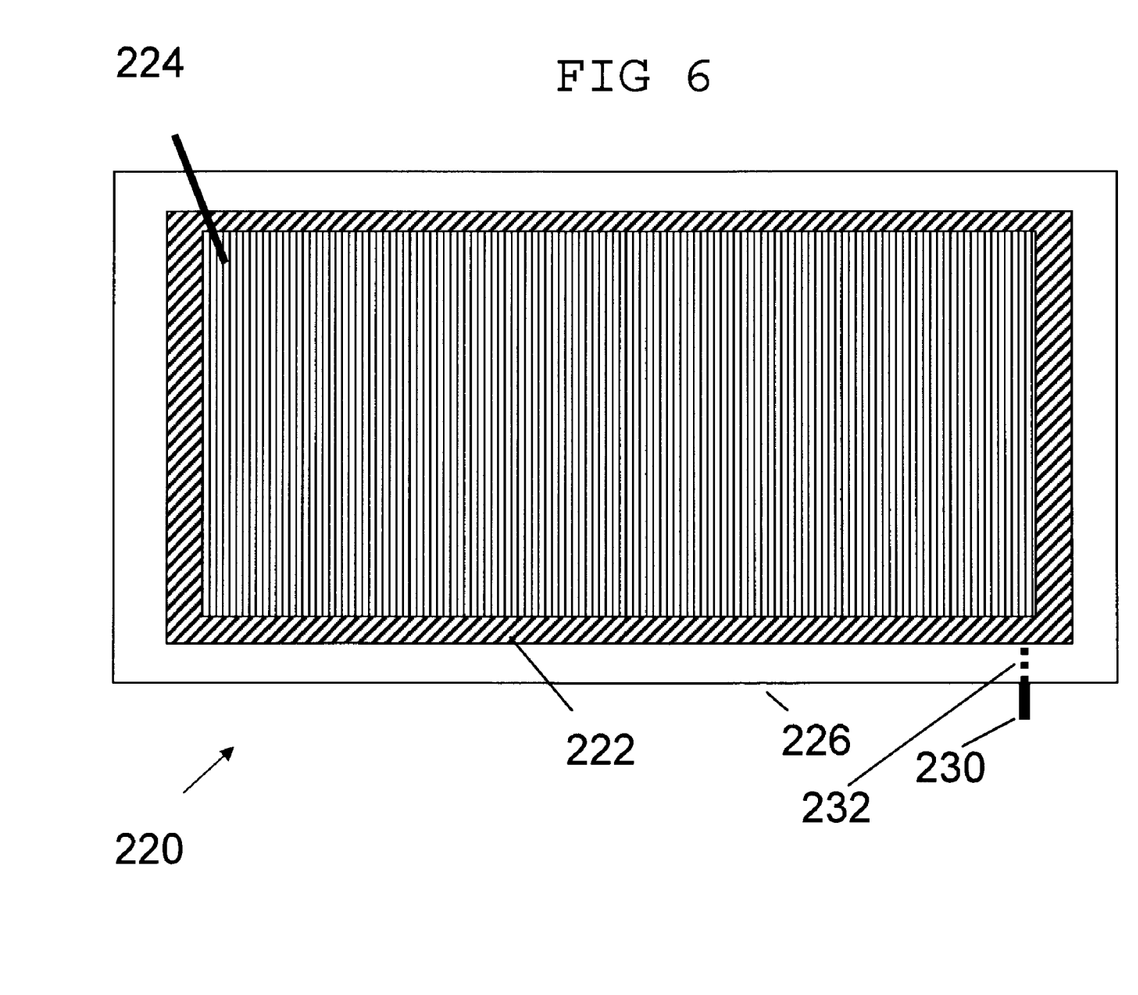
FIG. 6 shows yet another embodiment of the invention.

Referring now to FIG. 6 there is shown another example of the invention 220 where the diversion bladders 222 surround a drain 224 such as might be found in a parking lot or on a street to divert contaminants away from the drain. The drain may be surrounded by an array of contaminant detectors 226 that are in wireless communication 230 with the control 170 (FIG. 8) and in wireless communication 232 with the bladders 222 so that when a contaminant is detected an alarm is sounded at the control for the operator and an inflation signal 232 is sent to the bladder.

Method of Operation of a Network of Conduit Plugs

Figure 7:
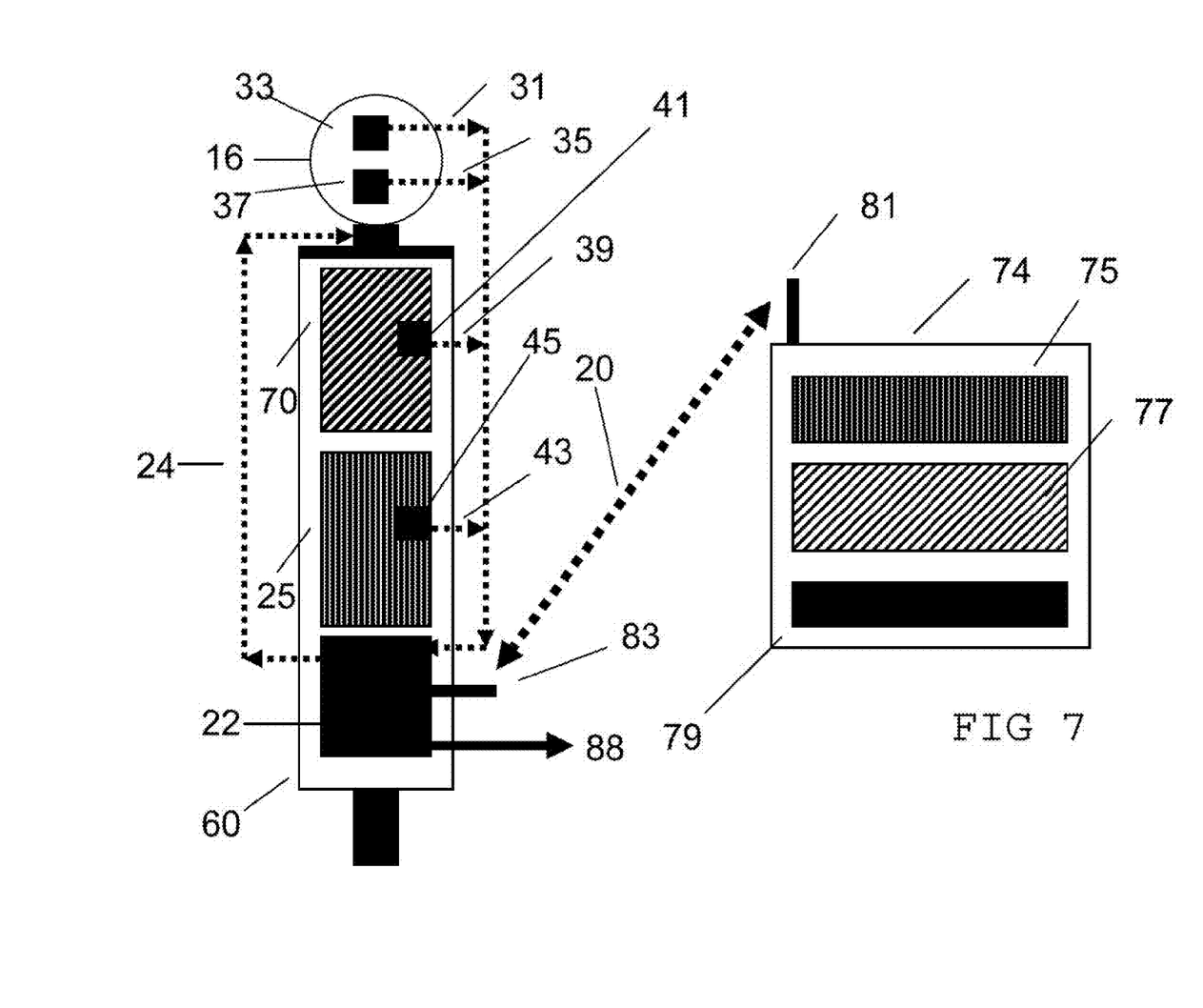
FIG. 7 shows a schematic of one example of an embodiment of the invention.

Referring now to FIG. 7 there is shown a schematic diagram of the control scheme used in one example of the invention. The contaminant sensor 74 can be located anywhere required to detect a contaminant. The sensor typically comprises a sensing element 75, a battery 77 and a RF emitter 79. When a contaminant is sensed by the sensor the sensor triggers the emitter and a contaminant signal 20 is relayed by antenna 81 to the RF receiver 83 located in the controller 22 housed within housing 60. The controller is typically a micro-processor and the RF receiver is contained within the circuit of the micro-processor. The micro-processor is also adapted to receive a signal 31 from the accelerometer 33 if the bladder does not inflate properly, a signal 35 from a pressure sensor 37 within the bladder if the bladder pressure is deficient or declining after inflation, a signal 39 from a pressure sensor 41 in the gas reservoir if the pressure is inadequate, a low voltage signal 43 from a low voltage sensor 45 on the battery 25.

In the event of any alarm condition detected by the micro-processor a RF signal 88 is sent to the operator 68 and a suitable alarm is annunciated on a remote control panel so that corrective action can be taken. In one example of the invention the contaminant sensors are programmable for detection of a plurality of contaminants. In another example of the invention, the micro-processor is adapted to generate an inflation signal for a plurality of contaminant threshold values.

Figure 8:
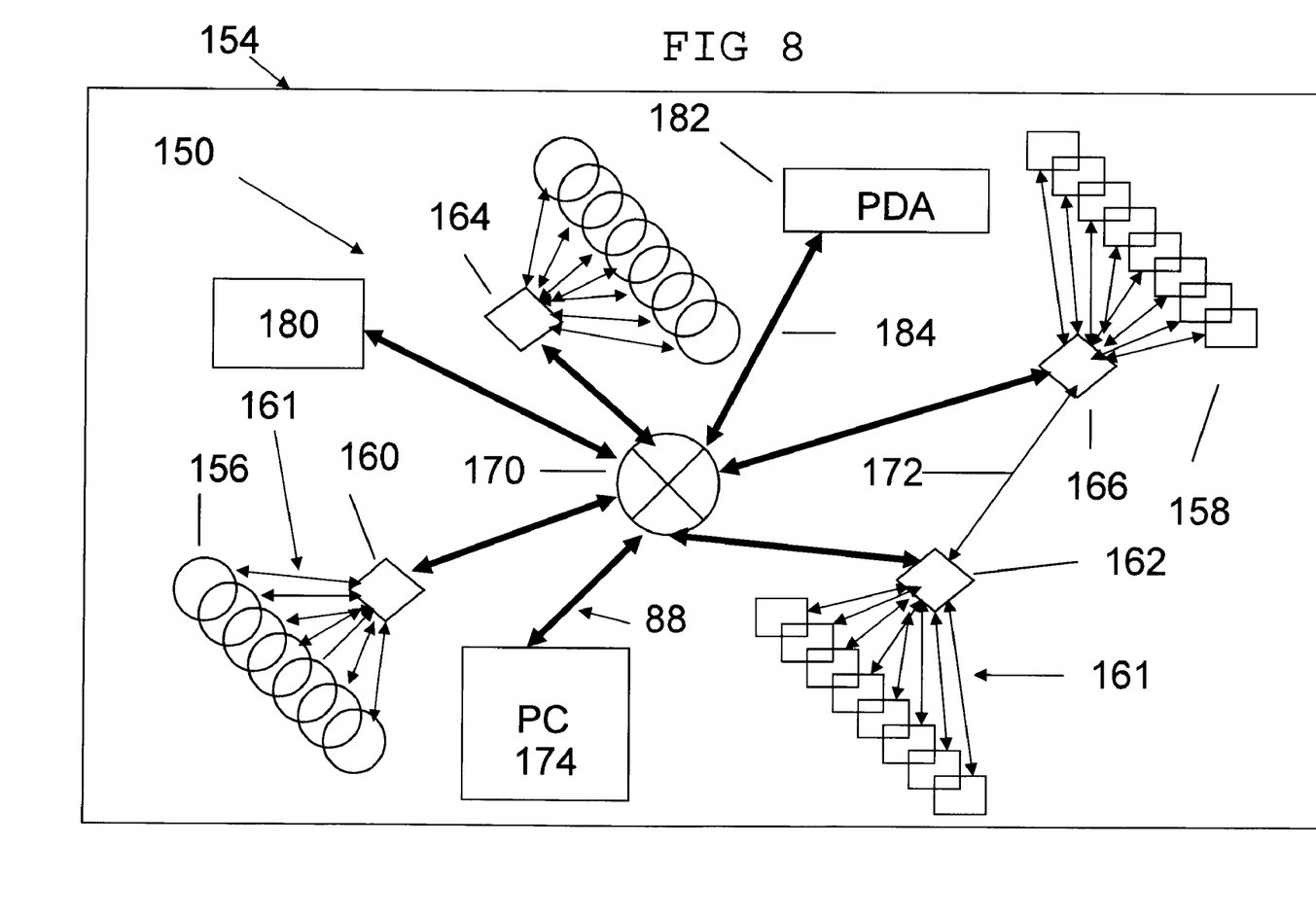
FIG. 8 shows a schematic of a network of embodiments of the invention.

Referring now to FIG. 8 there is shown a mesh network 150 of plugs arranged in a large industrial facility 154 which might comprises a plurality of liquid drain conduit plugs 156 and gaseous ventilation conduit plugs 158. The plugs 156 and 158 are arranged in zones wherein each zone contains a predetermined number of conduit plugs. The conduit plugs of each zone are in wireless communication 161 with a zone repeater 160, 162, 164 and 166. The zone repeaters are in wireless communication with a control unit 170. The zone repeaters and the control unit are located remote from the plugs. The zone repeaters are located within the industrial facility and arranged in such a manner that each plug is in wireless communication with at least one repeater. As indicated in FIG. 8, the plugs can be in wireless communication 172 with more than one repeater for redundancy purposes. The control is in wired or wireless communication with a PC 174 that will receive the various alarms described previously and alert 88 the operator as to their presence for remedial action. The operator can also use the PC to inflate different groups of plugs as required or disable groups of plugs for maintenance. The plugs can also be monitored from a remote location 180 in wired or wireless communication with the control unit 170. A portable device 182 such as a cell phone or a portable computing device can be used to receive alarms 184 and initiate inflation of all or particular plugs.

A method of operating a network of inflatable conduit plugs comprises the steps of:
1. Installing a plurality of conduit plugs in a plurality of fluid conduits;
2. Installing a suitable number of contaminant detectors in RF communication with each conduit plug of said plurality of conduit plugs;
3. Grouping a predetermined number of the plurality of conduit plugs into an operational zones;
4. Connecting said predetermined number of conduit plugs in each of said operational zones by way of RF communications to an operational zone repeater;
5. Connecting each of said operational zone repeaters by way of RF communications to a network controller; and,
6. Providing said network controller with a user interface.

Each of the operational zone repeaters can be connected to at least one other operational zone repeater for redundancy communications to the network controller.

The user interface is comprised in a computer and is programmed to identify the location and operational status of each inflatable conduit plug, zone repeater and contaminant detector.

The method operation further includes the step of providing RF remote communication between the user and the network controller by way of a portable device.

The network controller can communicate by communication means to remote controllers for remote control of the network.

Although the description above contains much specificity, these should not be construed as limiting the scope of the invention but as merely providing illustrations of some of the presently preferred embodiments of this invention. Thus the scope of the invention should be determined by the appended claims and their legal equivalents.

What is claimed is:

1. A conduit plug comprising:
   a shroud having an opening for sealed insertion into a conduit having an inner wall;
   an inflatable bladder disposed within said shroud for closing said shroud opening upon an inflation signal;
   bladder inflation means integral to the plug and in fluid communication with said bladder;
   contaminant detectors for generating a contaminant signal; and
   a controller for receiving said contaminant signal and transmitting said inflation signal,
   wherein the bladder is fabricated from a suitable chemically resistant material,
   wherein the bladder is disposed axially within the shroud, and
   wherein the bladder has a top and a bottom and wherein the bladder is fixed axially within the shroud at said bladder top and at said bladder bottom by a plurality of bracing rods extending from said shroud top inner surface and said shroud bottom inner surface, wherein the bladder is connected to said inflation means by a threaded connection, and wherein the bladder comprises:

an accelerometer for detecting inflation speed; and an alarm for alerting an operator when said inflation speed is sub-optimum.

2. A conduit plug comprising:

a shroud having an opening for sealed insertion into a conduit having an inner wall;

an inflatable bladder disposed within said shroud for closing said shroud opening upon an inflation signal;

bladder inflation means integral to the plug and in fluid communication with said bladder;

contaminant detectors for generating a contaminant signal; and a controller for receiving said contaminant signal and transmitting said inflation signal, wherein said contaminant detectors are sensors adapted to permit an uncontaminated fluid flow into the shroud opening and generate a contaminant signal when a contaminated fluid flow is detected, wherein the contaminant detectors are disposed remote from the conduit so that the contaminant signal is generated prior to the contaminant entering the shroud opening, wherein the contaminant detectors comprise an RF emitter adapted to generate an RF contaminant signal upon detection of a contaminant, wherein said RF signal is wirelessly transmitted to an RF receiver integral to the controller, wherein said bladder inflation means further comprises an electrical circuit comprising a battery for powering a micro-processor including said RF receiver adapted to receive said contaminant signal, and wherein said bladder inflation means comprises a reservoir containing a suitable inflation fluid, said reservoir integral to the plug, and wherein said electrical circuit further comprises:

a low voltage sensor for monitoring said battery voltage in communication with said micro-processor;

a low pressure sensor in communication with the reservoir for monitoring pressure within the reservoir;

a second low pressure sensor within the bladder for monitoring post-inflation bladder pressure in communication with the micro-processor; and an accelerometer within the bladder to measure inflation speed in communication with the micro-processor.

3. The plug of claim 2, wherein said reservoir is connected to said bladder via an electrically actuated inflation valve, and wherein said micro-processor is adapted to receive the contaminant signal from the contaminant detectors and transmit an inflation signal to said electrically actuated inflation valve.

4. The plug of claim 3, wherein the contaminant detectors are programmable for detection of a variety of contaminants.

5. The plug of claim 4, wherein the micro-processor is adapted to receive a signal from said accelerometer and transmit an alarm to an operator when said signal indicates suboptimal acceleration.

6. The plug of claim 5, wherein the micro-processor is programmable for a variety of contaminant threshold values.

* * * * *